United States Patent
Zhao et al.

(10) Patent No.: US 12,120,643 B2
(45) Date of Patent: Oct. 15, 2024

(54) METHODS FOR RESOURCE PROCESSING AND DEVICES

(71) Applicant: GUANGDONG OPPO MOBILE TELECOMMUNICATIONS CORP., LTD., Guangdong (CN)

(72) Inventors: Zhenshan Zhao, Guangdong (CN); Qianxi Lu, Guangdong (CN); Huei-Ming Lin, South Yarra (AU)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 279 days.

(21) Appl. No.: 17/553,000

(22) Filed: Dec. 16, 2021

(65) Prior Publication Data
US 2022/0110095 A1    Apr. 7, 2022

Related U.S. Application Data

(63) Continuation of application No. PCT/CN2019/097159, filed on Jul. 22, 2019.

(51) Int. Cl.
  H04W 72/02    (2009.01)
  H04W 72/0446    (2023.01)
  H04W 72/56    (2023.01)

(52) U.S. Cl.
  CPC ....... *H04W 72/02* (2013.01); *H04W 72/0446* (2013.01); *H04W 72/56* (2023.01)

(58) Field of Classification Search
  None
  See application file for complete search history.

(56) References Cited

U.S. PATENT DOCUMENTS

| | | | |
|---|---|---|---|
| 2015/0016312 A1* | 1/2015 | Li | H04W 74/006 370/280 |
| 2016/0295624 A1 | 10/2016 | Novlan et al. | |

(Continued)

FOREIGN PATENT DOCUMENTS

| | | |
|---|---|---|
| CN | 106792425 A | 5/2017 |
| CN | 109121166 A | 1/2019 |

(Continued)

OTHER PUBLICATIONS

3GPP TS 36.213 V15.3.0 (Sep. 2018), 14 UE procedures related to Sidelink. (474-529 pages).

(Continued)

*Primary Examiner* — Chi H Pham
*Assistant Examiner* — Raul Rivas
(74) *Attorney, Agent, or Firm* — Young Basile Hanlon & MacFarlane, P.C.

(57) ABSTRACT

A method for resource processing is provided. The method includes the following. A terminal device determines a first transmission resource set in a resource selection window. The first transmission resource set does not include a transmission resource in a slot in which a first transmission resource allocated to the terminal device by a network device is located, and a transmission resource in the first transmission resource set is used by the terminal device for transmission of a sidelink (SL) service. Other methods for resource processing and devices are further provided.

4 Claims, 7 Drawing Sheets

(56) References Cited

U.S. PATENT DOCUMENTS

| | | |
|---|---|---|
| 2018/0212733 A1 | 7/2018 | Khoryaev et al. |
| 2019/0223158 A1 | 7/2019 | Gao et al. |

FOREIGN PATENT DOCUMENTS

| | | | | |
|---|---|---|---|---|
| CN | 109644436 A | 4/2019 | | |
| CN | 109716837 A | 5/2019 | | |
| CN | 109964519 A | 7/2019 | | |
| EP | 4258769 A1 * | 10/2023 | ............ | H04W 72/02 |
| WO | 2015005701 A1 | 1/2015 | | |
| WO | 2018143741 A1 | 8/2018 | | |
| WO | 2019091143 A1 | 5/2019 | | |
| WO | 2019130556 A1 | 7/2019 | | |

OTHER PUBLICATIONS

International Search Report with English Translation for PCT Application PCT/CN2019/097159 mailed Apr. 7, 2020. (15 pages).
ZTE, "Resource allocation for D2D discovery", 3GPP TSG-RAN WG2 Meeting #85 R2-140692, dated Feb. 10-14, 2014, 5 pages.
First Office Action with English translation, issued in corresponding CN Application No. 201980098353.0, dated Jun. 26, 2024, 27 pages.

* cited by examiner

METHODS FOR RESOURCE PROCESSING AND DEVICES

CROSS-REFERENCE TO RELATED APPLICATION(S)

This application is a continuation of International Application No. PCT/CN2019/097159, filed on Jul. 22, 2019, the disclosure of which is hereby incorporated by reference in its entirety.

TECHNICAL FIELD

This disclosure relates to the field of wireless communication technology, and more particularly to methods for resource processing and devices.

BACKGROUND

Device to device (D2D) communication is based on sidelink (SL) transmission technology. Different from a traditional cellular system in which communication data is received or transmitted through a base station, in an internet of vehicles (IoV) system, D2D communication (that is, device-to-device direct communication) is adopted, which is high in spectral efficiency and low in transmission delay. For D2D communication, the third generation partnership project (3GPP) defines two transmission modes, namely a first mode and a second mode. In the first mode, a network device allocates a transmission resource to a terminal device, and in the second mode, the terminal device autonomously selects a transmission resource.

In a long term evolution-vehicle to everything (LTE-V2X) system, mode 3 and mode 4 are introduced. In a new radio (NR)-V2X (NR-V2X) system, multiple transmission modes are introduced, which include mode 1 and mode 2. In mode 3 and mode 1, the network device allocates a transmission resource to the terminal device, which correspond to the first mode. In mode 4 and mode 2, the terminal device autonomously selects a transmission resource, which correspond to the second mode.

When the first mode and the second mode share a resource pool, since the terminal device does not support simultaneous transmission of two types of transmission resources, how to avoid transmitting in the same slot a transmission resource corresponding to the first mode and a transmission resource corresponding to the second mode is a problem to be solved.

SUMMARY

In a first aspect, a method for resource processing is provided. The method includes the following. A terminal device determines a first transmission resource set in a resource selection window. The first transmission resource set does not include a transmission resource in a slot in which a first transmission resource allocated to the terminal device by a network device is located, and a transmission resource in the first transmission resource set is used by the terminal device for transmission of a sidelink (SL) service.

In a second aspect, a method for resource processing is provided. The method includes the following. A network device receives first information transmitted by a terminal device, where the first information is indicative of information of a transmission resource which is selected by the terminal device for transmission of an SL service. The network device allocates a first transmission resource to the terminal device according to the first information.

In a third aspect, a method for resource processing is provided. The method includes the following. A terminal device selects one transmission resource used for transmitting a service from a first transmission resource and a second transmission resource which are in the same slot, according to at least one of: a priority of a mode of the terminal device, a service attribute of the service, or a priority of an SL channel. The mode of the terminal device includes a first mode and a second mode, where in the first mode, the first transmission resource is allocated by a network device, and in the second mode, the second transmission resource is autonomously selected by the terminal device.

In a fourth aspect, a terminal device is provided. The terminal device includes a first processing unit. The first processing unit is configured to determine a first transmission resource set in a resource selection window, where the first transmission resource set does not include a transmission resource in a slot in which a first transmission resource allocated to the terminal device by a network device is located, and a transmission resource in the first transmission resource set is used by the terminal device for transmission of an SL service.

In a fifth aspect, a network device is provided. The network device includes a second receiving unit and a second processing unit. The second receiving unit is configured to receive first information transmitted by a terminal device, where the first information is indicative of information of a transmission resource which is selected by the terminal device for transmission of an SL service. The second processing unit is configured to allocate a first transmission resource to the terminal device according to the first information.

In a sixth aspect, a terminal device is provided. The terminal device includes a third processing unit. The third processing unit is configured to select one transmission resource used for transmitting a service from a first transmission resource and a second transmission resource which are in the same slot, according to at least one of: a priority of a mode of the terminal device, a service attribute of the service, or a priority of an SL channel. The mode of the terminal device includes a first mode and a second mode, where in the first mode, the first transmission resource is allocated by a network device, and in the second mode, the second transmission resource is autonomously selected by the terminal device.

In a seventh aspect, a terminal device is provided. The terminal device includes a processor and a memory. The memory is configured to store computer programs executable by the processor. The processor is configured to execute the computer programs to perform the above methods implemented by the terminal device.

In an eighth aspect, a network device is provided. The network device includes a processor and a memory. The memory is configured to store computer programs executable by the processor. The processor is configured to execute the computer programs to perform the above method implemented by the network device.

In a ninth aspect, a storage medium is provided. The storage medium is configured to store executable programs which, when executed by a processor, are operable with the processor to perform the above methods implemented by a terminal device.

In a tenth aspect, a storage medium is provided. The storage medium is configured to store executable programs which, when executed by a processor, are operable with the processor to perform the above method implemented by a network device.

DETAILED DESCRIPTION

In order for more comprehensive understanding of features and technical contents of implementations, the following will describe in detail implementations with reference to the accompanying drawings. The accompanying drawings herein are merely intended for illustration without limiting the implementations.

Methods for resource processing of implementations are applicable to various communication systems, for example, a global system of mobile communication (GSM), a code division multiple access (CDMA) system, a wideband code division multiple access (WCDMA) system, a general packet radio service (GPRS) system, a long term evolution (LTE) system, an LTE frequency division duplex (LTE-FDD) system, an LTE time division duplex (LTE-TDD) system, a universal mobile telecommunication system (UMTS), a worldwide interoperability for microwave access (WiMAX) communication system, or a 5$^{th}$ generation (5G) system.

Figure 1:
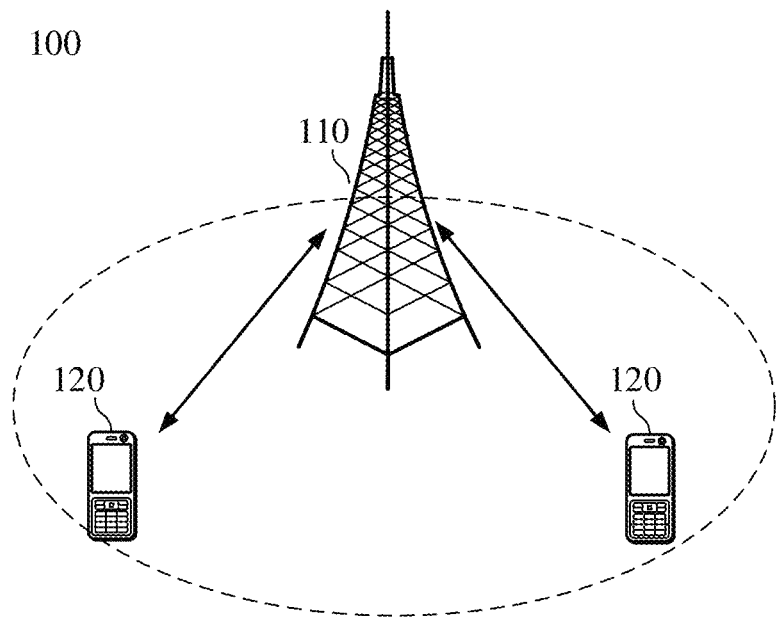
FIG. 1 is a schematic structural diagram of a communication system according to implementations.

FIG. 1 illustrates a communication system 100 of implementations. The communication system 100 may include a network device 110. The network device 110 may be a device that communicates with a terminal device 120 (also referred to as a communication terminal or a terminal). The network device 110 can provide a communication coverage for a specific geographical area and communicate with terminal devices in the coverage area. The network device 110 may be a base transceiver station (BTS) in the GSM or in the CDMA system, or may be a NodeB (NB) in the WCDMA system, or may be an evolutional Node B (eNB or eNodeB) in the LTE system, or a radio controller in a cloud radio access network (CRAN). Alternatively, the network device may be a mobile switching center, a relay station, an access point, an in-vehicle device, a wearable device, a hub, a switch, a bridge, a router, a network-side device in a 5G network, or a network device in a future evolved public land mobile network (PLMN).

The communication system 100 further includes at least one terminal device 120 in a coverage area of the network device 110. The "terminal device" referred to herein can include but is not limited to a device configured to communicate via a wired line, another data connection/network, a wireless interface, a device which is part of another terminal device and configured to receive/transmit communication signals, and/or an Internet of things (IoT) device. Examples of the wired line may include, but are not limited to, a public switched telephone network (PSTN), a digital subscriber line (DSL), a digital cable, and a direct connection cable. Examples of the wireless interface may include, but are not limited to, a wireless interface for a cellular network, a wireless local area network (WLAN), a digital television network (such as a digital video broadcasting-handheld (DVB-H) network), a satellite network, and an amplitude modulation-frequency modulation (AM-FM) broadcast transmitter. A terminal device configured to communicate via a wireless interface may be called a "wireless communication terminal", a "wireless terminal", or a "mobile terminal". Examples of a mobile terminal may include, but are not limited to, a satellite telephone or cellular telephone, a personal communication system (PCS) terminal integrated with functions of cellular radio telephone, data processing, fax, and/or data communication, a personal digital assistant (PDA) equipped with radio telephone, pager, Internet/Intranet access, web browsing, notebook, calendar, and/or global positioning system (GPS) receiver, and/or a conventional laptop, a handheld receiver, or other electronic devices equipped with radio telephone transceiver. The terminal device may refer to an access terminal, a user equipment (UE), a subscriber unit, a subscriber station, a mobile station, a remote station, a remote terminal, a mobile device, a user terminal, a terminal, a wireless communication device, a user agent, or a user device. The access terminal may be a cellular radio telephone, a cordless telephone, a session initiation protocol (SIP) telephone, a wireless local loop (WLL) station, a PDA, a handheld device with wireless communication functions, a computing device, other processing devices coupled with a wireless modem, an in-vehicle device, a wearable device, a terminal device in the 5G network, a terminal device in the future evolved PLMN, etc.

As an example, terminal devices 120 can communicate with each other through device to device (D2D) communication.

As an example, the 5G system or 5G network can also be referred to as a new radio (NR) system or NR network.

FIG. 1 exemplarily illustrates one network device and two terminal devices. The communication system 100 may also include multiple network devices, and there can be other numbers of terminal devices in a coverage area of each of the network devices, which is not limited herein.

The communication system 100 may further include other network entities such as a network controller, a mobile management entity, or the like, and the disclosure is not limited in this regard.

It should be understood that, a device with communication functions in a network/system of implementations can be referred to as a "communication device". Taking the communication system 100 illustrated in FIG. 1 as an example, the communication device may include the network device 110 and the terminal device(s) 120 that have communication functions. The network device 110 and the terminal device(s) 120 can be the devices described above and will not be repeated herein. The communication device may further include other devices such as a network controller, a mobile management entity, or other network entities in the communication system 100, and the disclosure is not limited in this regard.

It should be understood that, the terms "system" and "network" herein are usually used interchangeably throughout this disclosure. The term "and/or" herein only describes an association relationship between associated objects, which means that there can be three relationships. For example, A and/or B can mean A alone, both A and B exist, and B alone. In addition, the character "/" herein, unless otherwise specified, generally indicates that the associated objects are in an "or" relationship.

In order to facilitate understanding of technical solutions of implementations, the following will explain the technical terms used herein.

D2D Communication

D2D communication is based on sidelink (SL) transmission technology. Different from a traditional cellular system in which communication data is received or transmitted through a base station, in an internet of vehicles (IoV) system, D2D communication (that is, device-to-device direct communication) is adopted, which is high in spectral efficiency and low in transmission delay. For D2D communication, the third generation partnership project (3GPP) defines two transmission modes, namely a first mode and a second mode. The first mode and the second mode will be elaborated below.

The First Mode

Figure 2:
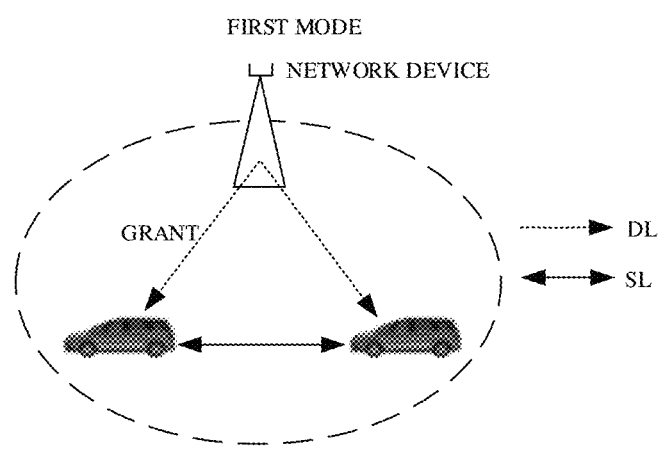
FIG. 2 is a schematic diagram illustrating transmission resource selection in a first mode according to implementations.

As illustrated in FIG. 2, a transmission resource of the terminal device is allocated by the base station. The terminal device transmits data on an SL by using a resource allocated by the base station. The resource allocated by the base station to the terminal device may be a resource for a single transmission or a resource for semi-static transmission.

The Second Mode

Figure 3:
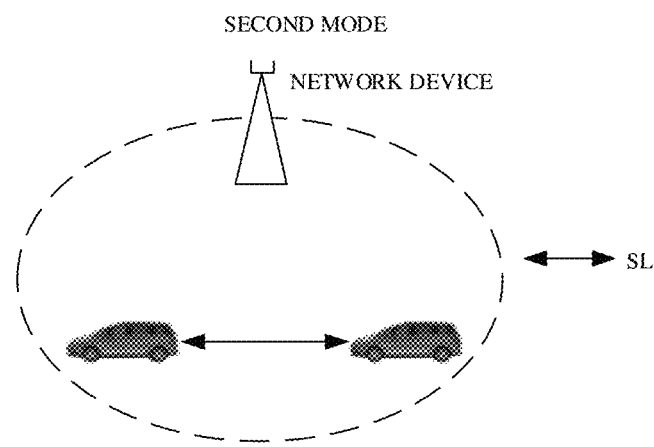
FIG. 3 is a schematic diagram illustrating transmission resource selection in a second mode according to implementations.

As illustrated in FIG. 3, the terminal device selects, from a resource pool, one transmission resource for data transmission.

In 3GPP, research on D2D includes the following stages.

Proximity based service (ProSe): In release (Rel)-12/13, research on D2D communication is aimed at a ProSe scenario, which is mainly intended for public safety services.

Vehicle to everything (V2X): In Rel-14/15, research on D2D communication is aimed at a V2X scenario, which is mainly intended for vehicle-to-vehicle (V2V) communication services and vehicle-to-pedestrian (V2P) communication services under a relatively high moving speed.

Wearable device (further enhanced D2D, FeD2D): In Rel-14, research on D2D communication is aimed at a scenario in which a wearable device accesses a network through a mobile phone, which is mainly intended for a scenario of low speed movement and low power access.

Sensing+Reservation

Figure 4:
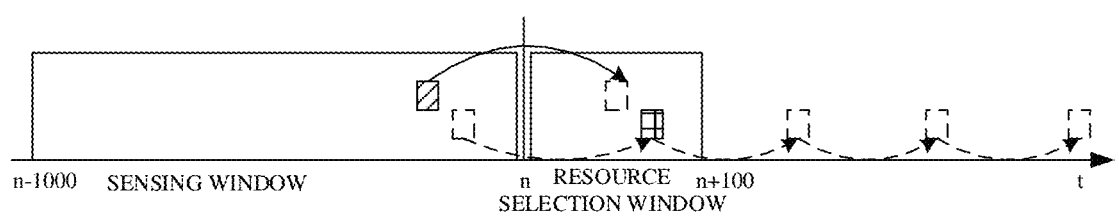
FIG. 4 is a schematic diagram illustrating transmission resource selection by a terminal device in a resource selection window according to implementations.

For a manner in which the terminal device autonomously determines a transmission resource (such as mode 4 in LTE-V2X), the terminal device determines a transmission resource through sensing as follows. When a new data packet arrives at time point n and there is a need to select a transmission resource for data transmission, the terminal device determines a resource selection window as [n+T1, n+T2]. The terminal device performs sensing in sensing window [n−1000, n−1], and determines a transmission resource in the resource selection window according to a sensing result, where T1<=4, and 20<=T2<=100, as illustrated in FIG. 4.

A general process of transmission resource selection in a resource selection window by the terminal device is given below. For a detailed process of transmission resource selection, reference can be made to 3GPP TS36.213 V15.3.0, and only some main steps are listed herein.

The terminal device determines set P which includes all available resources in the resource selection window, and then excludes some resources from set P.

1) If there is no sensing result in some subframes in a resource sensing window (for example, the terminal device transmits data in a subframe and thus there will be no sensing result in the subframe), resources in a selection window, which correspond to these subframes and are K periods subsequent to these subframes, are excluded.

2) If the terminal device successfully detects a physical sidelink control channel (PSCCH) in a sensing window, a reference signal received power (RSRP) of a physical sidelink shared channel (PSSCH) ("PSSCH-RSRP" for short) corresponding to the PSCCH is higher than a threshold, and there is resource collision between a next reserved transmission resource indicated by control information and data to be transmitted by the terminal device, the terminal device excludes the reserved transmission resource from set P.

3) If the number of resources remaining in set P is less than 20% of all resources in the resource selection window, the terminal device will increase a threshold of the PSSCH-RSRP by 3 dB (decibel) and repeats steps 1)-2), until the number of resources remaining in set P is greater than 20% of all resources in the resource selection window.

4) The terminal device performs sidelink received signal strength indicator (S-RSSI) measurement on the resources remaining in set P, sorts these resources in an order of energy level, and moves 20% of resources in set P, which have the lowest energy level(s), to set Q.

5) The terminal device selects, with an equal probability, one resource from set Q for data transmission.

The above sensing and resource selection are performed in a PSSCH resource pool. In LTE-V2X, transmission resources of a PSSCH and transmission resources of a PSCCH are in one-to-one correspondence. Therefore, by determining a transmission resource of a PSSCH, a transmission resource of a PSCCH can be determined accordingly.

Configured Grant

In 3GPP Rel-15, in order to reduce a transmission delay of uplink data, configured grant transmission (also referred to as grant-free transmission) is introduced, which mainly includes two configured grant manners, namely type-1 configured grant and type-2 configured grant.

Type-1 Configured Grant

A network device configures a transmission resource(s) and a transmission parameter(s) for the terminal device through radio resource control (RRC) signaling. Configuration information carried in the RRC signaling includes all of the configured transmission resource and the configured transmission parameter such as a time-domain resource, a frequency-domain resource, a demodulation reference signal (DMRS), power control related parameter, a modulation and coding scheme (MCS), a waveform, a redundancy version (RV) sequence, repetition times, a frequency hopping mode, the number of hybrid automatic repeat request (HARM) processes, and the like. The terminal device, upon receiving the RRC signaling, can immediately use the configured transmission parameter to perform physical uplink shared channel (PUSCH) transmission on a configured time-frequency resource.

Type-2 Configured Grant

A two-step configuration manner is adopted. First, a transmission resource(s) and a transmission parameter(s) are configured through higher layer parameter ConfiguredGrantConfig. The transmission resource and the transmission parameter may include a period of a time-frequency resource, an open-loop power control related parameter, a waveform, an RV sequence, repetition times, a frequency hopping mode, the number of HARQ processes, and the like. Then, PUSCH transmission corresponding to type-2 configured grant is activated through downlink control information (DCI), and other transmission resources and transmission parameters such as a time-domain resource, a frequency-domain resource, a DMRS, an MCS, and the like are further configured. After receiving higher layer parameter ConfiguredGrantConfig, the terminal device cannot immediately use the resources and parameters configured through the higher layer parameter for PUSCH transmission. Instead, PUSCH transmission can take place only when the terminal device receives a DCI for activation and other resources and transmission parameters are configured. In addition, the network device may deactivate PUSCH transmission corresponding to type-2 configured grant by using DCI. After receiving a DCI for deactivation, the terminal device can no longer use a type-2 configured grant transmission resource for transmission.

If the network device has allocated a configured-grant transmission resource to the terminal device, when the terminal device has uplink data to be transmitted, the terminal device can directly use the transmission resource for transmission, without transmitting to the network device a resource request message (such as a scheduling request (SR) message, and a buffer status report (BSR) message) to request a transmission resource, which is possible to reduce delay.

NR-V2X

NR-V2X needs to support automatic driving and therefore, higher requirements are put forward on data interaction between vehicles, such as higher throughput, lower delay, higher reliability, larger coverage, more flexible resource allocation, etc.

In an NR-V2X system, multiple transmission modes have been introduced, which include mode 1 and mode 2. In mode 1, a transmission resource is allocated to the terminal device by the network device (corresponding to the first mode described above). In mode 2, a transmission resource is selected by the terminal device (corresponding to the second mode described above).

In NR-V2X mode 1, configured grant based resource allocation is introduced in SL transmission. That is, the network device allocates an SL transmission resource to the terminal device through configured grant. When a configured-grant transmission resource is allocated to the terminal device, the terminal device can transmit SL data on the transmission resource, without transmitting to the network device an SR/BSR message to apply for a resource again, which can reduce transmission delay. In configured-grant transmission, the network device allocates a semi-static transmission resource to the terminal device. For type-1 configured grant, the network device configures a configured-grant transmission resource through RRC signaling, and the terminal device can transmit SL data on the configured-grant transmission resource. In addition, the network device can re-configure a configured-grant transmission resource through RRC signaling. For type-2 configured grant, the network device configures part of transmission parameters through RRC signaling, and configures a transmission resource and the rest of transmission parameters through DCI. The network device can activate or deactivate configured grant through DCI. When configured grant is activated, the terminal device can use the configured-grant transmission resource to transmit SL data. When configured grant is deactivated, the terminal device can no longer use the configured-grant transmission resource for transmission.

In addition, in NR-V2X mode 1, dynamic allocation of transmission resource is further introduced. When the terminal device has SL data to be transmitted, the terminal device sends a resource request to the network device. The network device allocates an SL transmission resource to the terminal device through DCI. The terminal device uses the transmission resource to transmit SL data. In NR-V2X mode 2, the terminal device autonomously selects a transmission resource from a resource pool that is allocated by the network device or pre-configured. The terminal device can determine an available transmission resource set from the resource pool through sensing. When the terminal device selects, from the available resource set, one transmission resource for data transmission, for a periodic transmission service, the terminal device may reserve a transmission resource for next transmission to avoid transmission resource preemption of other users; and for an aperiodic transmission service, the terminal device does not have to reserve a transmission resource.

In NR-V2X, the terminal device needs to support multiple services, and one terminal device may work simultaneously in mode 1 and in mode 2. In this case, if the terminal device transmits SL data in mode 1, the terminal device obtains resource grant information from the network device, and transmits SL data on a granted transmission resource. If the terminal device transmits SL data in mode 2, the terminal device obtains resource pool configuration information according to configuration information received from the network device or pre-configuration information, determines a resource pool according to the resource pool configuration information, and autonomously selects a transmission resource from the resource pool to transmit SL data.

However, if mode 1 and mode 2 each adopt a separate resource pool, it will result in insufficient use of resource. Therefore, mode 1 and mode 2 may share a resource pool, that is, a transmission resource in one resource pool may be used by the terminal device for not only transmission of SL data in mode 1 but also transmission of SL data in mode 2.

When the terminal device is operable simultaneously in mode 1 and in mode 2, a transmission resource corresponding to mode 1 is allocated by the network device, and a transmission resource corresponding to mode 2 is autonomously selected by the terminal device. However, the terminal device does not support simultaneous transmission of two PSSCHs. Therefore, how to avoid simultaneously transmitting the transmission resource corresponding to mode 1 and the transmission resource corresponding to mode 2 of the same terminal device is a problem to be solved. To this end, the following technical solutions are proposed.

In order to solve the above problem, implementations provide methods for resource processing, devices, and a storage medium, which can avoid transmitting in the same slot a transmission resource corresponding to a first mode and a transmission resource corresponding to a second mode.

The method provided herein includes the following. The terminal device determines the first transmission resource set in the resource selection window, where the first transmission resource set does not include the transmission resource in the slot in which the first transmission resource allocated to the terminal device by the network device is located, and the transmission resource in the first transmission resource set is used by the terminal device for transmission of an SL service. As such, when the terminal device autonomously determines a transmission resource, it is possible to avoid selecting a transmission resource corresponding to the first mode configured for the terminal device by the network device, which can avoid simultaneous transmission of an SL service corresponding to the first mode and an SL service corresponding to the second mode. In addition, after autonomously selecting a transmission resource corresponding to the second mode and reserving a transmission resource, the terminal device reports to the network device information of the selected transmission resource and information of the reserved transmission resource, and as such, it is possible to avoid the network device from scheduling for the terminal device a transmission resource in a slot in which the transmission resource selected by the terminal device is located and a transmission resource in a slot in which the transmission resource reserved by the terminal device is located, which is possible to avoid a situation where a transmission resource corresponding to the first mode and a transmission resource corresponding to the second mode are in the same slot.

Figure 5:
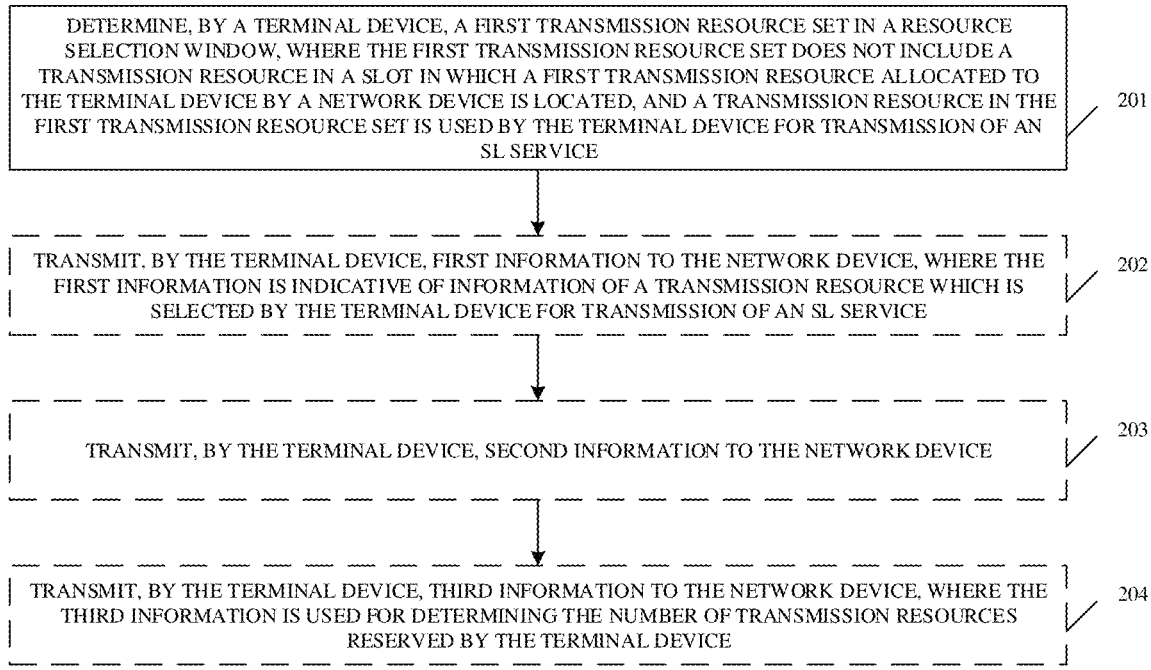
FIG. 5 is a schematic flowchart of a method for resource processing applicable to a terminal device according to implementations.

FIG. 5 is a schematic flowchart of a method for resource processing applicable to a terminal device according to implementations. As illustrated in FIG. 5, the method includes the following.

At block 201, a terminal device determines a first transmission resource set in a resource selection window, where the first transmission resource set does not include a transmission resource in a slot in which a first transmission resource allocated to the terminal device by a network device is located, and a transmission resource in the first transmission resource set is used by the terminal device for transmission of an SL service.

The resource selection window is a time period in which the terminal device determines an SL transmission resource.

According to implementations, the transmission resource in the first transmission resource set is used by the terminal device for transmission of an SL service in mode 2.

The first transmission resource allocated to the terminal device by the network device is used by the terminal device for transmission of an SL service in mode 1. The network device may allocate the first transmission resource to the terminal device through DCI or through configured grant.

In some implementations, the terminal device may determine the first transmission resource set in the resource selection window as follows. The terminal device determines, in the resource selection window, a second transmission resource set from a resource pool. As an example, the terminal device can determine the second transmission resource set from the resource pool in the resource selection window through sensing. The terminal device excludes, from the second transmission resource set, all transmission resources that are in the same slot as the first transmission resource.

In some implementations, after determining the second transmission resource set from the resource pool, the terminal device selects a third transmission resource from the second transmission resource set and reserves at least one fourth transmission resource. The fourth transmission resource is a transmission resource which is in a next transmission period and corresponds to the third transmission resource. The "corresponding transmission resource" may mean that the third transmission resource and the fourth transmission resource have the same frequency-domain start location and frequency-domain size in their respective transmission periods. A time domain interval between the third transmission resource and the fourth transmission resource is determined according to a transmission period of SL data to be transmitted. If the fourth transmission resource is in the same slot as a fifth transmission resource allocated to the terminal device by the network device, the terminal device excludes the third transmission resource from the second transmission resource set. In addition, the terminal device can further exclude, from the second transmission resource set, all transmission resources in a slot in which the third transmission resource is located.

In practice, determination of the first transmission resource set by the terminal device may take place after the network device configures the first transmission resource for the terminal device. That is, the network device first configures the first transmission resource for the terminal device, and then the terminal device autonomously determines the first transmission resource set. Alternatively, determination of the first transmission resource set by the terminal device may take place before the network device configures the first transmission resource for the terminal device. That is, the terminal device first autonomously determines the first transmission resource set, and then transmits information of the first transmission resource set to the network device. The network device allocates the first transmission resource to the terminal device according to the information of the first transmission resource set.

In some implementations, after operations at block 201, the following can be performed.

At block 202, the terminal device transmits first information to the network device, where the first information is indicative of information of a transmission resource which is selected by the terminal device for transmission of an SL service.

In some implementations, the terminal device transmits to the network device slot information of a slot in which a transmission resource selected by the terminal device is located. As an example, the first information is a slot number. The slot number is determined according to a system frame number (SFN) (or a direct frame number (DFN)) and a slot sequence number of the slot in one wireless frame. For example, for a subcarrier spacing (SCS) of 15 kHz (kilohertz), one slot corresponds to a period of 1 ms (millisecond). A slot sequence number in one wireless frame is in a range of [0, 9]. If an SFN of a wireless frame in which the slot is located is 3, and the slot sequence number of the slot in the wireless frame is 8, the slot number is determined as "38" according to the SFN and the slot sequence number. The terminal device reports "38" to the network device. As such, the network device can be informed of the slot information of the slot in which the transmission resource selected by the terminal device is located.

By transmitting, by the terminal device, to the network device the slot information of the slot in which the transmission resource selected by the terminal device is located, it is possible to avoid the network device from allocating to the terminal device a transmission resource in the same slot, thereby avoiding transmitting in the same slot a transmission resource corresponding to mode 1 and a transmission resource corresponding to mode 2 of the terminal device.

In some implementations, after operations at block 202, the following can be performed.

At block 203, the terminal device transmits second information to the network device.

The second information can be used for determining a time domain interval between the transmission resource selected by the terminal device and a transmission resource reserved by the terminal device. For example, the terminal device reserves a transmission resource which is 100 slots subsequent to the transmission resource selected by the terminal device, and thus the second information reported by the terminal device to the network device is "100". Since the terminal device has reported to the network device the slot information of the transmission resource selected by the terminal device at block 202, the network device can determine, according to the second information, a time interval between a next transmission resource reserved by the terminal device and a transmission resource currently selected by the terminal device. As such, the network device can further determine slot information corresponding to the next transmission resource.

Alternatively, the second information can be used for determining a service period of an SL service transmitted by the terminal device in a second mode. For example, the second information indicates a service period of an SL service transmitted by the terminal device in mode 2. If the service period is 100 ms, the terminal device selects a transmission resource and reserves a transmission resource, which is 100 ms subsequent to the selected transmission resource, for a next transmission. Therefore, after the terminal device reports the service period of the SL service to the network device, the network device can determine a time interval between the transmission resource reserved by the terminal device and a transmission resource currently selected by the terminal device. As such, the network device can further determine slot information of the next transmission resource.

According to implementations herein, the network device determines, according to the first information reported by the terminal device, the slot information of the transmission resource selected by the terminal device, and determines, according to the second information, the time interval between the next transmission resource reserved by the terminal device and the transmission resource currently selected by the terminal device. As such, the network device can further determine the slot information of the next transmission resource.

In some implementations, after operations at block 203, the following can be performed.

At block 204, the terminal device transmits third information to the network device, where the third information is used for determining the number of transmission resources reserved by the terminal device.

For example, if the terminal device reserves transmission resources in subsequent 4 transmission periods (that is, the terminal device reserves 4 transmission resources), the third information reported by the terminal device to the network device is "4". The network device can determine, according to the third information, that the number of transmission resources reserved by the terminal device is 4. The terminal device can determine, according to the first information, the second information, and the third information, the slot information of the transmission resource selected by the terminal device and slot information of the transmission resource reserved by the terminal device, which is possible to prevent the network device from allocating to the terminal device a transmission resource in a slot corresponding to the above slot information.

In some implementations, the following can be performed before operations at block 201, after operations at block 202, after operations at block 203, or after operations at block 204.

At block 205, the terminal device receives configuration information from the network device, where the configuration information is used for determining the first transmission resource.

The first transmission resource is not in the same slot as the transmission resource which is selected by the terminal device for transmission of an SL service, or the first transmission resource is not in the same slot as the transmission resource reserved by the terminal device.

In practice, if operations at block 205 are performed before operations at block 201, after receiving the configuration information from the network device, the terminal device can determine the first transmission resource. The terminal device autonomously determines the first transmission resource set in such a manner that the first transmission resource set does not include the transmission resource in the slot in which the first transmission resource is located.

If operations at block 205 are performed after operations at block 202, after operations at block 203, or after operations at block 204, when allocating the first transmission resource to the terminal device, the network device does not allocate a transmission resource in a slot in which the transmission resource selected by the terminal device is located or a transmission resource in a slot in which the transmission resource reserved by the terminal device is located in operations at block 201 to block 204.

Figure 6:
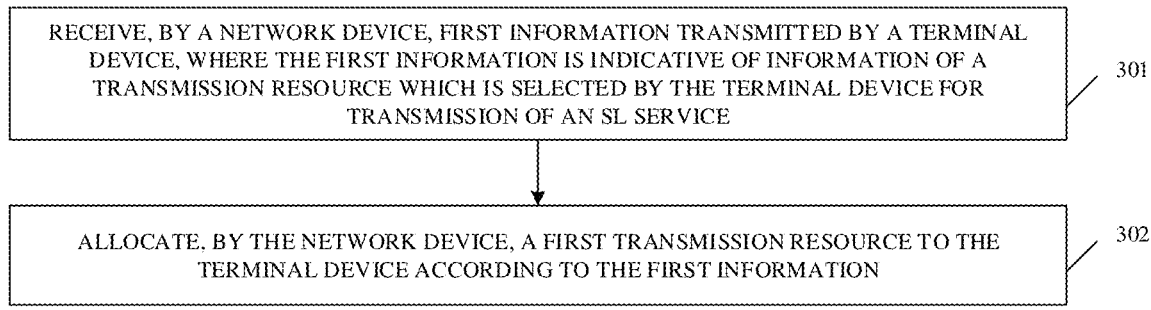
FIG. 6 is a schematic flowchart of a method for resource processing applicable to a network device according to implementations.

FIG. 6 is a schematic flowchart of a method for resource processing applicable to a network device according to implementations. As illustrated in FIG. 6, the method includes the following.

At block 301, a network device receives first information transmitted by a terminal device, where the first information is indicative of information of a transmission resource which is selected by the terminal device for transmission of an SL service.

For details of the first information, reference can be made to descriptions of the first information in the above operations at block 202, which will not be repeated herein.

At block 302, the network device allocates a first transmission resource to the terminal device according to the first information.

In some implementations, the network device determines, according to the first information, a slot in which a transmission resource selected by the terminal device is located.

The network device allocates the first transmission resource to the terminal device, where the first transmission resource is not a transmission resource in the slot. That is, the network device does not allocate a transmission resource in the slot to the terminal device. In this way, the first transmission resource is not in the same slot as the transmission resource selected by the terminal device.

In some implementations, after operations at block 302, the following can be performed.

At block 302a, the network device receives second information transmitted by the terminal device.

The second information is used for determining a time domain interval between the transmission resource selected by the terminal device and a transmission resource reserved by the terminal device. Alternatively, the second information is used for determining a service period of an SL service transmitted by the terminal device in a second mode, where in the second mode, an SL transmission resource used by the terminal device is autonomously selected by the terminal device.

For details of the second information, reference can be made to descriptions of the second information in the above operations at block 203, which will not be repeated herein.

In some implementations, the network device determines, according to the first information and the second information, a slot in which the transmission resource selected by the terminal device is located and a slot in which the transmission resource reserved by the terminal device is located. The network device allocates the first transmission resource to the terminal device, where the first transmission resource is not a transmission resource in any of the two slots. As such, the first transmission resource is not in the same slot as any of the transmission resource selected by the terminal device and the transmission resource reserved by the terminal device.

In some implementations, after operations at block 302a, the following can be performed.

At block 302b, the network device receives third information transmitted by the terminal device, where the third information is used for determining the number of transmission resources reserved by the terminal device.

For details of the third information, reference can be made to descriptions of the third information in the above operations at block 204, which will not be repeated herein.

In some implementations, the following can be performed after operations at block 302, after operations at block 302a, or after operations at block 302b.

At block 303, the network device transmits configuration information to the terminal device, where the configuration information is used for determining the first transmission resource.

The first transmission resource is not in the same slot as the transmission resource which is selected by the terminal device for transmission of an SL service, or the first transmission resource is not in the same slot as the transmission resource reserved by the terminal device.

After the network device transmits the configuration information to the terminal device, the terminal device can determine the first transmission resource. As such, when autonomously selecting a transmission resource or reserving a transmission resource, the terminal device can exclude, from an available transmission resource set, all transmission resources in a slot in which the first transmission resource is located.

The foregoing implementations aim at how to avoid a situation where the transmission resource selected by the terminal device or the transmission resource reserved by the terminal device is in the same slot as the transmission resource allocated by the network device, in the case where the terminal device autonomously selects a transmission resource or reserves a transmission resource, or the network device allocates a transmission resource to the terminal device. As such, resource collision can be avoided.

The following will describe a method for resource processing of implementations, for a scenario in which the transmission resource selected by the terminal device or the transmission resource reserved by the terminal device is in the same slot as the transmission resource allocated by the network device.

Figure 7:
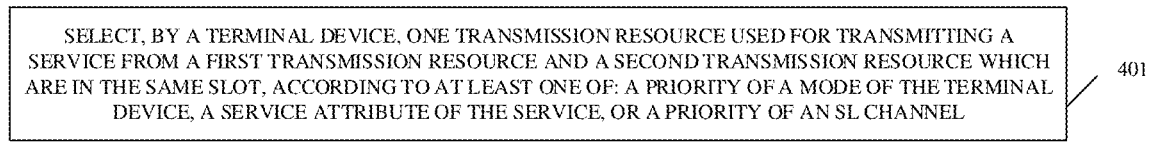
FIG. 7 is a schematic flowchart of a method for resource processing applicable to a terminal device according to other implementations.

FIG. 7 is a schematic flowchart of a method for resource processing applicable to a terminal device according to other implementations. As illustrated in FIG. 7, the method includes the following.

At block 401, a terminal device selects one transmission resource used for transmitting a service from a first transmission resource and a second transmission resource which are in the same slot, according to at least one of: a priority of a mode of the terminal device, a service attribute of the service, or a priority of an SL channel.

The mode of the terminal device includes a first mode and a second mode. In the first mode, the first transmission resource is allocated by a network device, and in the second mode, the second transmission resource is autonomously selected by the terminal device. It can be understood that, the first mode corresponds to mode 1 described above, and the second mode corresponds to mode 2 described above.

In some implementations, the terminal device selects the first transmission resource when a priority of the first mode is higher than that of the second mode. The priority of the mode of the terminal device is configured by the network device or pre-configured.

In some implementations, the service attribute includes any one of: priority, reliability, delay, and transmission rate.

In practice, the terminal device selects a transmission resource corresponding to a service having higher priority, a transmission resource corresponding to a service having higher reliability, a transmission resource corresponding to a service having shorter delay, or a transmission resource corresponding to a service having higher transmission rate.

In some implementations, the SL channel includes any two of: a PSCCH, a PSSCH, a physical sidelink feedback channel (PSFCH), and a physical sidelink broadcast channel (PSBCH). The terminal selects a transmission resource corresponding to an SL channel having a higher priority. The priority of the SL channel is configured by the network device or pre-configured. For example, the PSCCH has a higher priority than the PSSCH, the PSFCH has a higher priority than the PSCCH or the PSSCH, and the PSBCH has a higher priority than the PSSCH.

Figure 8:
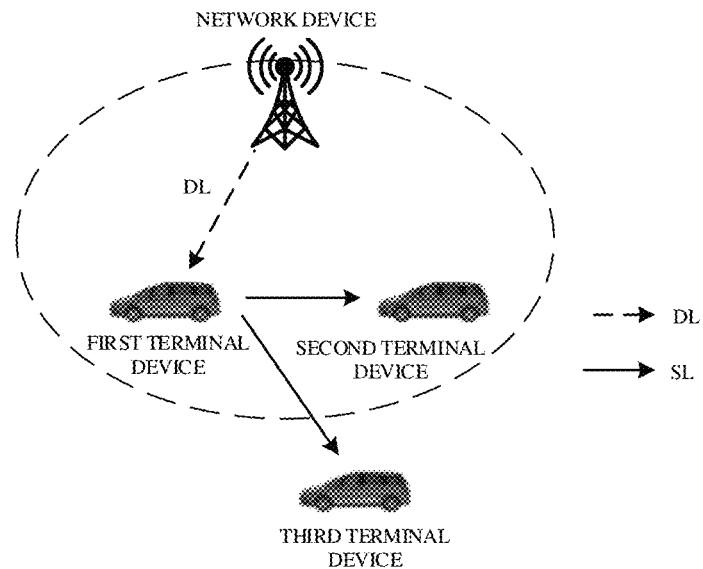
FIG. 8 is a schematic diagram illustrating communication between terminal devices according to implementations.

As an example, FIG. 8 is a schematic diagram illustrating communication between terminal devices according to implementations. As illustrated in FIG. 8, a first terminal device in a cell acts as a data transmitter, and a second terminal device and a third terminal device act as data receivers, where the second terminal device is in the cell, and the third terminal device is outside the cell. The first terminal device transmits data to the second terminal device in mode 1, that is, the first terminal device uses a transmission resource configured by a network device to transmit an SL service to the second terminal device. The first terminal device transmits data to the third terminal device in mode 2, that is, the first terminal device obtains information of a resource pool configured by the network device, autonomously obtains a transmission resource from the resource pool through sensing, and uses the obtained transmission resource to transmit SL data to the third terminal device.

Figure 9:
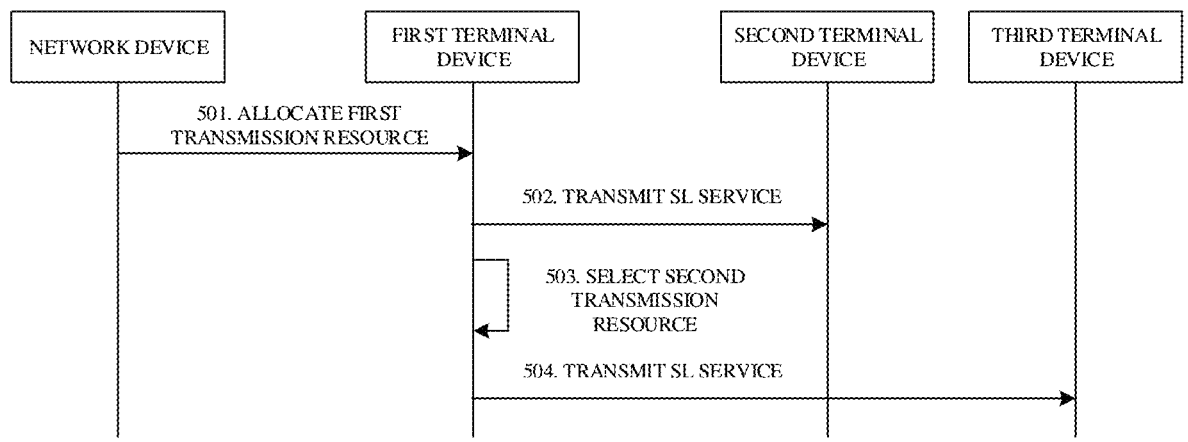
FIG. 9 is a schematic flowchart of a method for resource processing according to implementations.

The following will elaborate a method for resource processing of implementations, in which the network device first allocates the first transmission resource to the terminal device and then the terminal device autonomously selects a transmission resource. FIG. 9 is a schematic flowchart of a method for resource processing according to implementations. As illustrated in FIG. 9, the method includes the following.

At block 501, a network device allocates a first transmission resource to a first terminal device.

As an example, the network device allocates the first transmission resource to the first terminal device through DCI. The first transmission resource may include a resource used for a single transmission, or may include a transmission resource used for multiple transmissions (for example, initial transmission and retransmission of data).

As another example, the network device allocates the first transmission resource to the first terminal device through configured grant. The configured grant may be type-1 configured grant, that is, the first transmission resource and transmission parameters are configured through RRC signaling. Alternatively, the configured grant may be type-2 configured grant, that is, some SL transmission parameters are configured through RRC signaling, the other transmission parameters and the first transmission resource are configured through DCI, and configured grant is activated or deactivated through the DCI. A transmission resource allocated by the network device through configured grant includes multiple periodic transmission resources.

At block 502, the first terminal device transmits an SL service on the first transmission resource.

The first terminal device performs SL communication with a second terminal device in mode 1. The first terminal device transmits an SL service to the second terminal device on the first transmission resource.

At block 503, the first terminal device selects a second transmission resource through sensing.

According to implementations herein, the first terminal device can determine a second transmission resource set through existing sensing, and determine a first transmission resource set by excluding, from the second transmission resource set, all transmission resources in a slot in which the first transmission resource is located. Then the first terminal device selects, from the first transmission resource set, the second transmission resource which is used by the first terminal device for SL communication with a third terminal device in mode 2.

Figure 10:
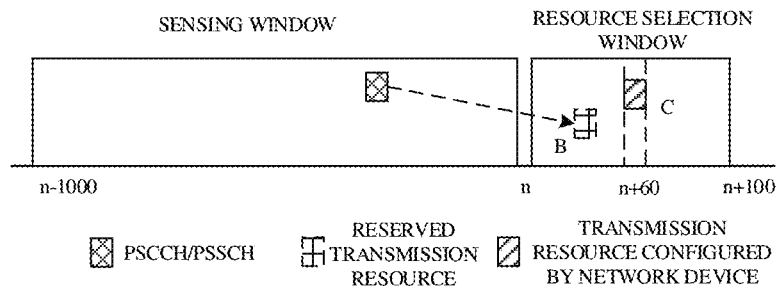
FIG. 10 is a schematic diagram illustrating determination of a first transmission resource set by a first terminal device according to implementations.

FIG. 10 is a schematic diagram illustrating determination of the first transmission resource set by the first terminal device according to implementations. In a resource selection window, through sensing, the first terminal device excludes a transmission resource (such as transmission resource B) which is reserved by a terminal device other than first terminal device from the second transmission resource set. If there is a transmission resource configured by the network device (such as transmission resource C) in the resource selection window, the first terminal device excludes all transmission resources in a slot in which transmission resource C is located from the second transmission resource set. For example, in slot n+60, if there is transmission resource C configured by the network device, the first terminal device excludes all resources in slot n+60 from the second transmission resource set.

Figure 11:
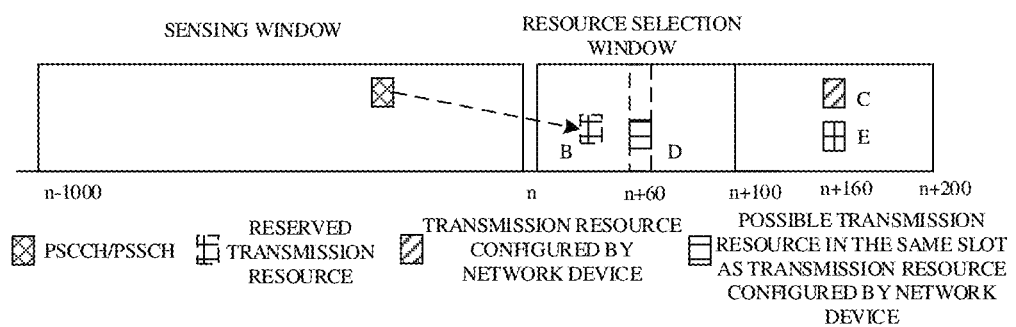
FIG. 11 is a schematic diagram illustrating determination of a first transmission resource set by a first terminal device according to other implementations.

As another example, in the resource selection window, there is no transmission resource configured for the first terminal device by the network device. However, if the first terminal device selects a transmission resource in the resource selection window and reserves a transmission resource(s) for next one transmission (or next K transmissions), and among the transmission resource(s) reserved by the first terminal device, at least one transmission resource is in the same slot as the transmission resource configured by the network device, the first terminal device excludes, from the second transmission resource set, all transmission resources in a slot in which the transmission resource selected by the first terminal device is located. FIG. 11 is a schematic diagram illustrating determination of the first transmission resource set by the first terminal device according to other implementations. A range of the resource selection window of the first terminal device is slot [n+1, n+100]. In the resource selection window, there is no transmission resource configured by the network device, but there is transmission resource C configured by the network device in slot n+160. If the first terminal device selects transmission resource D in slot n+60 in the resource selection window and reserves transmission resource E which is 100 slots subsequent to transmission resource D, and transmission resource E and transmission resource C are in the same slot, the first terminal device excludes, from the second transmission resource set, all transmission resources in a slot in which transmission resource D is located (that is, all transmission resources in slot n+60).

According to implementations herein, after excluding unavailable transmission resources from the second transmission resource set, the first terminal device can continue to adopt an existing sensing mechanism to select a transmission resource. For example, the first terminal device performs energy detection on the remaining transmission resources, and selects M % (for example, M=20) of the remaining transmission resources, which have the lowest energy level(s), as the available first transmission resource set. Then the first terminal device selects, with an equal probability, one transmission resource from the first transmission resource set as a transmission resource that is used for transmission of an SL service with the third terminal device in mode 2.

At block 504, the first terminal device transmits an SL service to the third terminal device on the selected transmission resource.

In implementations herein, there is no order of execution between operations at block 502 and operations at block 503. Operations at block 502 may be performed before operations at block 503, or operations at block 503 may be performed before operations at block 502. In addition, when operations at block 503 are performed before operations at block 502, there is no order of execution between operations at block 502 and operations at block 504, operations at block 502 may be performed before operations at block 504, or operations at block 504 may be performed before operations at block 502.

The method provided herein is applicable to resource determination in periodic services and aperiodic services in mode 2. When determining a transmission resource set corresponding to mode 2 through sensing, the first terminal device avoids selecting a transmission resource corresponding to mode 1 that is configured by the network device for the first terminal device, thereby avoiding simultaneous transmission of an SL service corresponding to mode 2 and an SL service corresponding to mode 1. Since a transmission resource corresponding to mode 1 has been excluded during sensing for a transmission resource corresponding to mode 2, there is no need for the network device to allocate again a transmission resource corresponding to mode 1 to the first terminal device, which is possible to reduce signaling overhead between the first terminal device and the network device.

Figure 12:
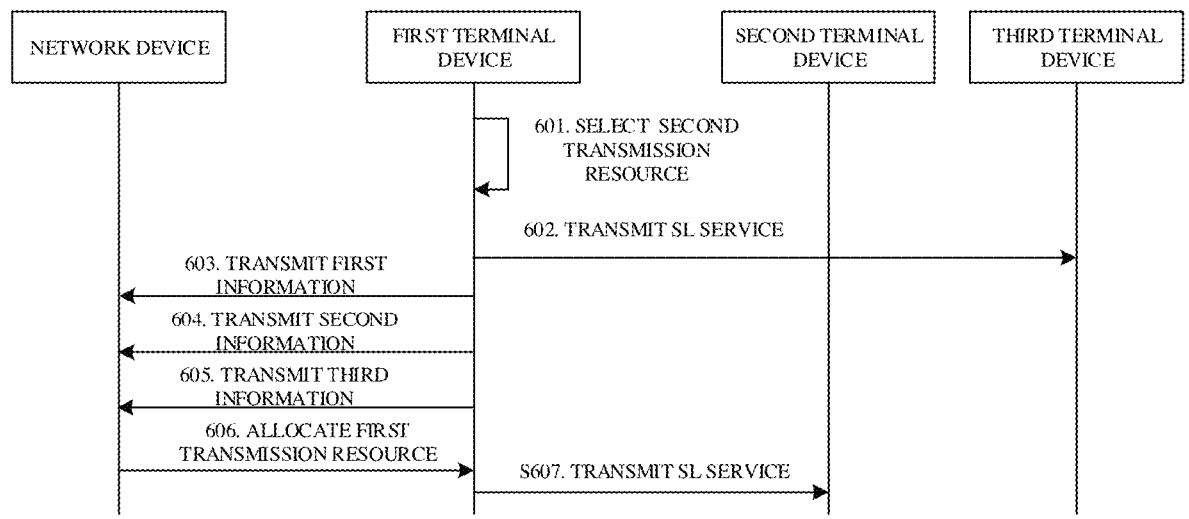
FIG. 12 is a schematic flowchart of a method for resource processing according to other implementations.

The following will elaborate a method for resource processing of implementations, in which the terminal device first autonomously selects a transmission resource, and then the network device allocates the first transmission resource to the terminal device. FIG. 12 is a schematic flowchart of a method for resource processing according to other implementations. As illustrated in FIG. 12, the method includes the following.

At block 601, a first terminal device selects a second transmission resource through sensing.

The process of selecting the second transmission resource by the first terminal device is similar to the process of selecting the second transmission resource by the first terminal device mentioned above in operations at block 503 and thus will not be repeated herein.

At block 602, the first terminal device transmits an SL service to a third terminal device on the second transmission resource.

At block 603, the first terminal device transmits first information to a network device.

The network device can determine, according to the first information, slot information of a slot in which the second transmission resource selected by the first terminal device is located.

For details of the first information, reference can be made to descriptions of the first information in operations at block 203, which will not be repeated herein.

At block 604, the first terminal device transmits second information to the network device.

The network device can determine, according to the second information, slot information of a slot in which the second transmission resource selected by the first terminal device is located and slot information of a slot in which one transmission resource reserved by the first terminal device is located.

For details of the second information, reference can be made to descriptions of the second information in operations at block 204, which will not be repeated herein.

At block 605, the first terminal device transmits third information to the network device.

The network device can determine, according to the third information, slot information of a slot in which the second transmission resource selected by the first terminal device is located and slot information of slots in which multiple transmission resources reserved by the first terminal device are located.

For details of the third information, reference can be made to descriptions of the third information in operations at block 205, which will not be repeated herein.

At block 606, the network device allocates a first transmission resource to the first terminal device according to the first information, the second information, and the third information.

At block 607, the first terminal device transmits an SL service to a second terminal device on the first transmission resource in mode 1.

In implementations herein, before operations at block 601, the following can be performed. The network device allocates a transmission resource corresponding to mode 1 to the first terminal device. In this scenario, at block 601, when obtaining the second transmission resource through sensing, the first terminal device excludes all transmission resources in a slot in which the transmission resource allocated by the network device to the first terminal device is located.

The method provided herein is applicable to transmission resource determination in periodic services in mode 2. For a scenario in which there is a reserved transmission resource, a terminal device can report the reserved transmission resource to the network device, which is possible to prevent the network device from scheduling for the terminal device a transmission resource in a slot in which a transmission resource selected by the terminal device is located and a transmission resource in a slot in which a transmission resource reserved by the terminal device is located, thereby avoiding a situation where a transmission resource corresponding to mode 1 and a transmission resource corresponding to mode 2 are in the same slot.

The term "service" herein is equivalent to data. Therefore, "the terminal device transmits an SL service" may mean that the terminal device transmits SL data.

The following will describe in detail a method for resource processing of implementations, for a scenario in which the terminal device needs not only transmission of a service corresponding to mode 1 but also transmission of a service corresponding to mode 2 in the same slot.

A terminal device selects one transmission resource used for transmitting a service from a first transmission resource and a second transmission resource which are in the same slot, according to at least one of: a priority of a mode of the terminal device, a service attribute of the service, or a priority of an SL channel.

The mode of the terminal device includes a first mode and a second mode. In the first mode, the first transmission resource is allocated by a network device, and in the second mode, the second transmission resource is autonomously selected by the terminal device.

1) The terminal device selects a transmission resource according to the priority of the mode of the terminal device. When a priority of the first mode is higher than that of the second mode, the terminal device selects the first transmission resource corresponding to the first mode.

2) The terminal device selects a transmission resource according to the service attribute. The service attribute includes any one of: priority, reliability, delay, and transmission rate.

For example, in mode 1, a first service is transmitted, and in mode 2, a second service is transmitted. The terminal device determines, according to priority of each of the first service and the second service, which transmission resource is selected. If the first service has higher priority than the second service, the terminal device selects a transmission resource corresponding to the first service and abandons transmission of the second service. If the first service has lower priority than the second service, the terminal device selects a transmission resource corresponding to the second service and abandons transmission of the first service. Alternatively, the terminal device determines, according to delay of each of the first service and the second service, which transmission resource is selected. If the first service has a delay requirement higher than that of the second service, for example, the delay requirement of the first service is 10 ms, while the delay requirement of the second service is 20 ms, the terminal device selects the transmission resource corresponding to the first service and abandons transmission of the second service. If the first service has a delay requirement lower than that of the second service, the terminal device selects the transmission resource corresponding to the second service and abandons transmission of the first service. Alternatively, the terminal device determines, according to transmission rate of each of the first service and the second service, which transmission resource is selected. If the first service has higher service transmission rate than the second service, the terminal device selects the transmission resource corresponding to the first service and abandons transmission of the second service. If the first service has lower service transmission rate than the second service, the terminal device selects the transmission resource corresponding to the second service and abandons transmission of the first service.

Priority of a service is priority of a logical channel corresponding to the service. The priority of the service is the highest priority among priorities of logical channels corresponding to the service. If priority information is carried in sidelink control information (SCI) of an SL service or SL data to be transmitted, the priority of the service is indicated by the priority information carried in the SCI.

3) The terminal device selects a transmission resource according to the priority of an SL channel.

The SL channel includes any two of a PSCCH, a PSSCH, a PSFCH, and a PSBCH. A priority relationship between SL channels may be pre-configured or configured by the network device. For example, according to pre-configuration information, the PSFCH has a higher transmission priority than the PSSCH, and the PSCCH has a higher transmission priority than the PSSCH. The terminal device determines, according to a transmission-priority relationship between SL channels that is pre-configured or configured by the network device, which one of an SL channel corresponding to mode 1 and an SL channel corresponding to mode 2 is transmitted.

According to implementations herein, when transmission in mode 1 and transmission in mode 2 are in the same slot, one transmission resource is selected according to the priority of an SL channel, the service attribute, or the priority of the mode of the terminal device, which is possible to first ensure transmission of a service having a higher priority.

Figure 13:
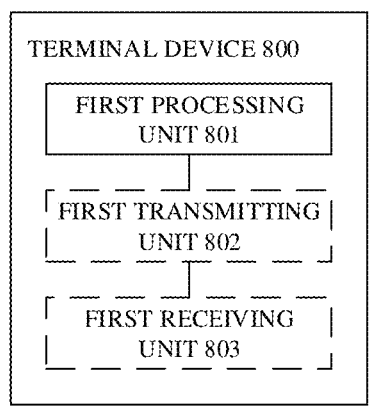
FIG. 13 is a schematic structural diagram of a terminal device according to implementations.

In order to implement the method for resource processing of implementations, a terminal device is provided. FIG. 13 is a schematic structural diagram of a terminal device 800 according to implementations. As illustrated in FIG. 13, the terminal device 800 includes a first processing unit 801. The first processing unit 801 is configured to determine a first transmission resource set in a resource selection window, where the first transmission resource set does not include a transmission resource in a slot in which a first transmission resource allocated to the terminal device by a network device is located, and a transmission resource in the first transmission resource set is used by the terminal device for transmission of an SL service.

In some implementations, the first processing unit 801 is configured to operate as follows. The first processing unit 801 is configured to determine a second transmission resource set in the resource selection window. The first processing unit 801 is configured to exclude, from the second transmission resource set, all transmission resources that are in the same slot as the first transmission resource.

In some implementations, the first processing unit 810 is further configured to exclude a third transmission resource from the second transmission resource set, on condition that the terminal device selects the third transmission resource from the second transmission resource set and reserves at least one fourth transmission resource, and the at least one fourth transmission resource is in the same slot as a fifth transmission resource allocated to the terminal device by the network device.

In some implementations, the terminal device 800 further includes a first transmitting unit 802. The first transmitting unit 802 is configured to transmit first information to the network device, where the first information is indicative of information of a transmission resource which is selected by the terminal device for transmission of an SL service.

In some implementations, the first information is used for determining slot information of a slot in which a transmission resource selected by the terminal device is located.

In some implementations, the first transmitting unit 802 is further configured to transmit second information to the network device. The second information is used for determining a time domain interval between the transmission resource selected by the terminal device and a transmission resource reserved by the terminal device. Alternatively, the second information is used for determining a service period of an SL service transmitted by the terminal device in a second mode, where in the second mode, a transmission resource used by the terminal device is autonomously selected by the terminal device.

In some implementations, the first transmitting unit 802 is further configured to transmit third information to the network device, where the third information is used for determining the number of transmission resources reserved by the terminal device.

In some implementations, the terminal device 800 further includes a first receiving unit 803. The first receiving unit 803 is configured to receive configuration information from the network device, where the configuration information is used for determining the first transmission resource. The first transmission resource is not in the same slot as the transmission resource which is selected by the terminal device for transmission of an SL service, or the first transmission resource is not in the same slot as the transmission resource reserved by the terminal device.

Figure 14:
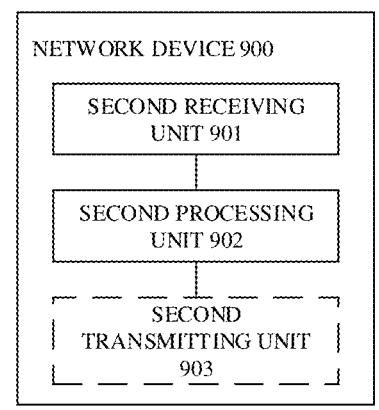
FIG. 14 is a schematic structural diagram of a network device according to implementations.

In order to implement the method for resource processing of implementations, a network device is provided. FIG. 14 is a schematic structural diagram of a network device 900 according to implementations. As illustrated in FIG. 14, the network device 900 includes a second receiving unit 901 and a second processing unit 902. The second receiving unit 901 is configured to receive first information transmitted by a terminal device, where the first information is indicative of information of a transmission resource which is selected by the terminal device for transmission of an SL service. The second processing unit 902 is configured to allocate a first transmission resource to the terminal device according to the first information.

In some implementations, the first information is used for determining slot information of a slot in which a transmission resource selected by the terminal device is located.

In some implementations, the second receiving unit 901 is further configured to receive second information transmitted by the terminal device. The second information is used for determining a time domain interval between the transmission resource selected by the terminal device and a transmission resource reserved by the terminal device. Alternatively, the second information is used for determining a service period of an SL service transmitted by the terminal device in a second mode, where in the second mode, an SL transmission resource used by the terminal device is autonomously selected by the terminal device.

In some implementations, the second receiving unit 901 is further configured to receive third information transmitted by the terminal device, where the third information is used for determining the number of transmission resources reserved by the terminal device.

In some implementations, the first transmission resource is not in the same slot as the transmission resource selected by the terminal device.

In some implementations, the second processing unit 902 is configured to operate as follows. The second processing unit 902 is configured to determine, according to the first information, a slot in which the transmission resource selected by the terminal device is located. The second processing unit 902 is configured to allocate the first transmission resource to the terminal device, where the first transmission resource is not a transmission resource in the slot.

In some implementations, the first transmission resource is not in the same slot as any of the transmission resource selected by the terminal device and the transmission resource reserved by the terminal device.

In some implementations, the second processing unit 902 is configured to operate as follows. The second processing unit 902 is configured to determine, according to the first information, a slot in which the transmission resource selected by the terminal device is located and a slot in which the transmission resource reserved by the terminal device is located. The second processing unit 902 is configured to allocate the first transmission resource to the terminal device, where the first transmission resource is not a transmission resource in any of the two slots.

In some implementations, the network device 900 further includes a second transmitting unit 903. The second transmitting unit 903 is configured to transmit configuration information to the terminal device, where the configuration information is used for determining the first transmission resource. The first transmission resource is not in the same slot as the transmission resource which is selected by the terminal device for transmission of an SL service, or the first transmission resource is not in the same slot as the transmission resource reserved by the terminal device.

Figure 15:
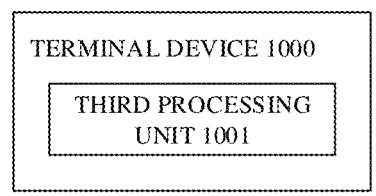
FIG. 15 is a schematic structural diagram of a terminal device according to other implementations.

In order to implement the method for resource processing of implementations, a terminal device is provided. FIG. 15 is a schematic structural diagram of a terminal device 1000 according to other implementations. As illustrated in FIG. 15, the terminal device 1000 further includes a third processing unit 1001. The third processing unit 1001 is configured to select one transmission resource used for transmitting a service from a first transmission resource and a second transmission resource which are in the same slot, according to at least one of: a priority of a mode of the terminal device, a service attribute of the service, or a priority of an SL channel. The mode of the terminal device includes a first mode and a second mode, where in the first mode, the first transmission resource is allocated by a network device, and in the second mode, the second transmission resource is autonomously selected by the terminal device.

In some implementations, the third processing unit 1001 is configured to select the first transmission resource when a priority of the first mode is higher than that of the second mode.

In some implementations, the service attribute includes any one of: priority, reliability, delay, and transmission rate.

In some implementations, the third processing unit 1001 is configured to select a transmission resource corresponding to a service having higher priority, select a transmission resource corresponding to a service having higher reliability, select a transmission resource corresponding to a service having shorter delay, or select a transmission resource corresponding to a service having higher transmission rate.

In some implementations, the SL channel includes any two of: a PSCCH, a PSSCH, a PSFCH, and a PSBCH.

In some implementations, the priority of the SL channel is configured by the network device or pre-configured, and/or the priority of the mode of the terminal device is configured by the network device or pre-configured.

In some implementations, the third processing unit 1001 is configured to select a transmission resource corresponding to an SL channel having a higher priority.

Implementations further provided a terminal device. The terminal device includes a processor and a memory. The memory is configured to store computer programs executable by the processor. The processor is configured to execute the computer programs to perform the foregoing methods implemented by the terminal device.

Implementations further provided a network device. The network device includes a processor and a memory. The memory is configured to store computer programs executable by the processor. The processor is configured to execute the computer programs to perform the foregoing method implemented by the network device.

Figure 16:
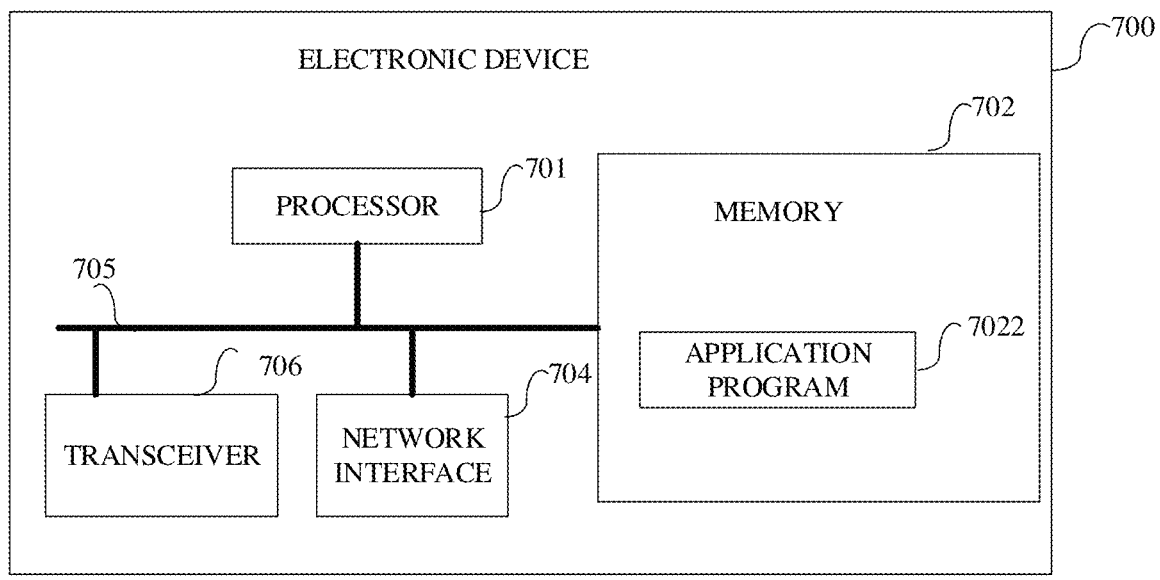
FIG. 16 is a schematic structural diagram of hardware of an electronic device according to implementations.

FIG. 16 is a schematic structural diagram of hardware of an electronic device (terminal device or network device) according to implementations. The electronic device 700 includes at least one processor 701, a memory 702, at least one network interface 704, and a transceiver 706. Various components of the electronic device 700 are coupled together via a bus system 705. It can be understood that, the bus system 705 is configured for connection and communication between these components. In addition to a data bus, the bus system 705 further includes a power bus, a control bus, and a status signal bus. However, for the convenience of description, various buses are marked as the bus system 705 in FIG. 16.

It can be understood that, the memory 702 may be a volatile memory or a non-volatile memory, or may include both the volatile memory and the non-volatile memory. The non-volatile memory may be a read only memory (ROM), a programmable ROM (PROM), an erasable PROM (EPROM), an electrically EPROM (EEPROM), a ferromagnetic random access memory (FRAM), a flash memory, a magnetic surface memory, an optical disc, or a compact disc (CD)-ROM, where the magnetic surface memory may be a magnetic disc memory or a magnetic tape memory. The volatile memory can be a RAM that acts as an external cache. By way of example but not limitation, many forms of RAM are available, such as a static RAM (SRAM), a synchronous SRAM (SSRAM), a dynamic RAM (DRAM), a synchronous DRAM (SDRAM), a double data rate SDRAM (DDR SDRAM), an enhanced SDRAM (ESDRAM), a synclink DRAM (SLDRAM), and a direct rambus RAM (DR RAM). The memory 702 herein is intended to include, but is not limited to, these and any other suitable types of memory.

The memory 702 herein is configured to store various types of data to support operations of the electronic device 700. Examples of the data include any computer program operable on the electronic device 700, for example, an application program 7022. A program for implementing the methods of implementations may be included in the application program 7022.

The methods disclosed in the foregoing implementations are applicable to the processor 701, or may be implemented by the processor 701. The processor 701 referred to herein may be an integrated circuit chip with signal processing capabilities. During implementation, each step of the foregoing method may be completed by an integrated logic circuit of hardware in the processor 701 or an instruction in the form of software. The processor 701 may be a general-purpose processor, a digital signal processor (DSP), or other programmable logic devices, discrete gates or transistor logic devices, discrete hardware components, etc. The processor 701 can implement or execute the methods, steps, and logic blocks disclosed in implementations. The general purpose processor may be a microprocessor, or the processor may be any conventional processor or the like. The steps of the method disclosed in implementations may be directly implemented as a hardware decoding processor, or may be performed by hardware and software modules in the decoding processor. The software module can be located in a storage medium. The storage medium is located in the memory 702. The processor 701 reads the information in the memory 702, and completes the steps of the method described above with the hardware thereof.

The electronic device 700 of implementations may be implemented by one or more application specific integrated circuits (ASIC), DSPs, programmable logic devices (PLD), complex programmable logic devices (CPLD), FPGAs, general-purpose processors, controllers, microcontroller units (MCU), microprocessor units (MPU), or other electronic components, to perform the methods in the foregoing implementations.

Implementations further provided a storage medium. The storage medium is configured to store computer programs.

The storage medium is applicable to the terminal device of implementations. The computer programs, when executed, are operable with a computer to implement the operations performed by the terminal device described in the foregoing method implementations, which will not be repeated herein for the sake of simplicity.

Implementations herein are described with reference to flowcharts and/or block diagrams of the method, device (system), and computer program product of implementations. It should be understood that, computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may also be stored in a computer-readable memory that can instruct the computer or any other programmable data processing device to work in a specific manner, so that the instructions stored in the computer-readable memory generate an artifact that includes an instruction apparatus. The instruction apparatus implements a specific function in one or more processes in the flowcharts and/or in one or more blocks in the block diagrams.

These computer program instructions may also be loaded onto a computer or another programmable data processing device, so that a series of operations and steps are performed on the computer or the programmable device, thereby generating computer-implemented processing. Therefore, the instructions executed on the computer or the programmable device provide steps for implementing a specific function in one or more processes in the flowcharts and/or in one or more blocks in the block diagrams.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method for resource processing, comprising:
   determining, by a terminal device, a first transmission resource set in a resource selection window, wherein
   the first transmission resource set does not comprise a transmission resource in a slot in which a first transmission resource allocated to the terminal device by a network device is located, and a transmission resource in the first transmission resource set is used by the terminal device for transmission of a sidelink (SL) service;
   wherein determining, by the terminal device, the first transmission resource set in the resource selection window comprises:
      determining, by the terminal device, a second transmission resource set in the resource selection window; and
      excluding, by the terminal device, from the second transmission resource set, all transmission resources that are in the same slot as the first transmission resource;
   wherein the method further comprises:
      excluding, by the terminal device, a third transmission resource from the second transmission resource set, on condition that the terminal device selects the third transmission resource from the second transmission resource set and reserves at least one fourth transmission resource, and the at least one fourth transmission resource is in the same slot as a fifth transmission resource allocated to the terminal device by the network device.

2. The method of claim 1, further comprising:
   transmitting, by the terminal device, first information to the network device, wherein the first information is indicative of information of a transmission resource which is selected by the terminal device for transmission of an SL service.

3. The method of claim 2, further comprising:
   transmitting, by the terminal device, second information to the network device, wherein the second information is used for determining one of:
   a time domain interval between a transmission resource selected by the terminal device and a transmission resource reserved by the terminal device; or
   a service period of an SL service transmitted by the terminal device in a second mode, wherein in the second mode, a transmission resource used by the terminal device is autonomously selected by the terminal device.

4. A terminal device, comprising:
   a memory storing computer programs; and
   a processor configured to execute the computer programs to determine a first transmission resource set in a resource selection window, wherein
   the first transmission resource set does not comprise a transmission resource in a slot in which a first transmission resource allocated to the terminal device by a network device is located, and a transmission resource in the first transmission resource set is used by the terminal device for transmission of a sidelink (SL) service;

wherein the processor is configured to:
  determine a second transmission resource set in the resource selection window; and
  exclude, from the second transmission resource set, all transmission resources that are in the same slot as the first transmission resource;

wherein the processor is further configured to:
  exclude a third transmission resource from the second transmission resource set, on condition that the terminal device selects the third transmission resource from the second transmission resource set and reserves at least one fourth transmission resource, and the at least one fourth transmission resource is in the same slot as a fifth transmission resource allocated to the terminal device by the network device.

* * * * *